United States Patent [19]

Mason

[11] Patent Number: 5,138,013
[45] Date of Patent: Aug. 11, 1992

[54] EPOXY CURABLE ION-CONDUCTING ELECTROLYTE USEFUL IN ELECTROCHROMIC DEVICES

[75] Inventor: Claude F. Mason, Ypsilanti, Mich.

[73] Assignee: Ford Motor Company, Dearborn, Mich.

[21] Appl. No.: 628,022

[22] Filed: Dec. 17, 1990

[51] Int. Cl.$^5$ .............................................. C08G 77/14
[52] U.S. Cl. .......................................... 528/27; 528/38
[58] Field of Search .................................... 528/27, 38

[56] References Cited

U.S. PATENT DOCUMENTS

| | | | |
|---|---|---|---|
| 4,233,428 | 11/1980 | Endo | 525/507 |
| 4,250,074 | 2/1981 | Foscante et al. | 260/32.8 EP |
| 4,604,443 | 8/1986 | Chang et al. | 528/27 |
| 4,624,998 | 11/1986 | Keil | 525/476 |
| 4,650,835 | 3/1987 | Eck et al. | 528/27 |
| 4,882,243 | 11/1989 | Skotheim et al. | 429/192 |
| 5,016,991 | 5/1991 | Mason | 350/357 |

FOREIGN PATENT DOCUMENTS 1187239  5/1985  Canada .

OTHER PUBLICATIONS

Charbouillot et al. "Aminosils: New Solid State Protonic Materials by the Sol-Gel Process" 1988.

*Primary Examiner*—John C. Bleutge
*Assistant Examiner*—M. Glass
*Attorney, Agent, or Firm*—Lorraine S. Melotik; Roger L. May

[57] ABSTRACT

This invention is directed to a polyether-functional liquid electrolyte and epoxy curable liquid electrolyte compositions comprising same, methods of making such materials and electrochromic devices comprising such materials. The liquid electrolyte is a hydrolytic condensation product of aminosilane containing (i) at least one active amine group, and (ii) at least two hydrolyzable polyether groups attached to a silicon atom, wherein the product has some of the polyether groups attached to some of the silicon atoms.

8 Claims, 1 Drawing Sheet

EPOXY CURABLE ION-CONDUCTING ELECTROLYTE USEFUL IN ELECTROCHROMIC DEVICES

BACKGROUND OF THE INVENTION

1. Field of the Invention

This invention is directed to a polyether-functional, liquid electrolyte, an epoxy curable electrolyte composition made from same and method for making both. More particularly, the liquid electrolyte is a hydrolytic condensation Product of aminosilane containing (i) at least one active amine group, and (ii) at least two hydrolyzable polyether groups attached to a silicon atom, wherein the product has some of the polyether groups attached to some of the silicon atoms.

2. Discussion of the Related Art

Electrochromic devices are devices in which a physical/chemical change produced in response to the induced electric field results in a change in the reflective or transmissive properties of the device with respect to electromagnetic radiations, e.g., UV, visible and IR radiations. Such devices generally include a film of electrochromic material and an ion-conductive insulating layer which functions as an electrolyte layer. The film and the electrolyte layer are in surface contact with each other for exchange of ions between the electrochromic film and the electrolyte layer. Two conductive electrode layers, at least one of them being transparent, are disposed on the opposite outer surfaces of the electrochromic material film and the electrolyte layer to provide means for applying a voltage across the Combined thickness of the electrochromic film and the electrolyte layer. The electrode layers are provided on substrates, which substrates may be of a material such as glass. Depending on the ion providing and ion storage capacity of ion conductive layer, a counter electrode located between ion conductive layer and electrode layer may be used. The electrodes are provided with external electrical leads connected to a voltage providing source.

The application of a voltage of proper polarity across the electrodes causes coloration of the electrochromic layer. By reversing the polarity of the applied voltage, the colored electrochromic layer will be uncolored (bleached). Changing from the bleached state to the colorless state or from the colored state to the bleached is termed "switching". The electrochromic material may be persistent in either its colored state or its noncolored state. By "persistent" is meant the ability of the material to remain, after removal of the electric field, in the absorptive state to which it is changed, as distinguished from a substantially instantaneous reversion to the initial state. The length of time a material is persistent is called its "open circuit memory" or simply "memory". Electrochromic devices of this type have been described for several uses, such as for image display, for light filtering, etc.

In such devices, the electrochromic film usually comprises an inorganic metal oxide material, most commonly a transition metal oxide, in particular tungsten oxide. When tungsten oxide is the electrochromic material, the electrolyte layer is adapted to provide a positively charged light metal cation, preferably, a proton or a lithium ion.

The electrolyte layer is generally a liquid electrolyte solution, typically based on sulfuric acid or lithium perchlorate in propylene carbonate. However, use of a liquid electrolyte has the inherent disadvantage associated with containment of a fluid. That is, it is required with liquid electrolytes used in layered electrochromic devices that the edges of the device be sealed so as to retain the liquid electrolyte. In addition, cell components such as the preferred tungsten oxide electrochromic material as well as certain electrode materials are attacked by acidic electrolyte materials, limiting the utility of strong acids for this application. Similar problems exist with gel electrolytes, such as the sulfuric acid-polyvinyl alcohol electrolyte gel.

Solid electrolytes form another class of electrolytes suggested for use in electrochromic devices. Solid electrolyte of complex halides are known, particularly iodides, of silver with alkali metal or quaternary ammonium ions, e.g., $RbAg_4I_5$. Additionally, solid electrolytes may comprise aluminum compounds such as sodium beta-alumina and potassium beta-alumina. However, these electrolytes are all typically expensive to prepare and, in the case of the alumina compounds, could not be formed directly on components of an electrochromic device since they require very high processing temperatures. Others have suggested forming a solid electrolyte comprising a sheet of porous glass impregnated with a solid, ion-conductive silver or alkali metal compound One disadvantage of employing such an impregnated glass sheet is that, because it is a solid of limited flexibility, it would be difficult to assemble the component layers of an electrochromic device and achieve the intimate contact required between this sheet and the adjacent layers.

U.S. Pat. No. 4,250,074 to Foscante et al is directed to a modified epoxy coating composition comprising an interpenetrating polymer network of epoxy polymer and polysiloxane. It is disclosed therein that the network can be prepared by simultaneously reacting an epoxy resin with an aminosilane, water being substantially uniformly distributed throughout the mixture in an amount sufficient to bring about substantial hydrolytic polycondensation of the silane. The epoxy coating composition of the patent, in contrast to the present invention electrolyte, does not allow for polyether groups attached to the silicon atom.

It would be highly desirable to be able to provide a curable liquid electrolyte composition into an electrochromic device which, because it is initially a liquid when provided in the device, has the ability to intimately contact even irregularly shaped surfaces. It would be even more desirable if such a liquid electrolyte could be cured in place at room temperature in the device to form a solid electrolyte so as to avoid problems with its containment. It would be additionally desirable if the solid electrolyte would have an excellent ionic conductivity.

The aforementioned problems of prior art electrolytes are overcome by the curable liquid electrolyte of the present invention

SUMMARY OF THE INVENTION

This invention is directed to a polyether-functional liquid electrolyte. The polyether-functional liquid electrolyte is a hydrolytic condensation product of aminosilane containing (i) at least one active amine group, and (ii) at least two hydrolyzable polyether groups attached to a silicon atom, the hydrolytic condensation product having some of the hydrolyzable polyether groups attached to some of the silicon atoms. The aminosilane, prior to hydrolytic condensation thereof, preferably comprises three of the same or different hydrolyzable polyether groups attached to a silicon atom. The hydrolytic condensation product preferably has, on average, at least one, and more preferably two such hydrolyzable polyether groups attached to each silicon atom. This polyether-functional liquid electrolyte may be used, for example, as the electrolyte in an electrochromic device.

According to another aspect of the invention, this invention is directed to a method for making the polyether-functional liquid electrolyte disclosed above, which method comprises: forming a reaction mixture of (i) aminosilane containing at least one active amine group, and at least two hydrolyzable polyether groups attached to a silicon atom and (ii) water in an amount sufficient to initiate hydrolytic polycondensation of the aminosilane, and allowing hydrolytic polycondensation of the aminosilane in the reaction mixture for a time and at a temperature sufficient to form a liquid hydrolytic polycondensation product which has some hydrolyzable polyether groups attached to some of the silicon atoms. It is preferable to have at least one and more preferable to have two such polyether groups attached to each silicon atom.

According to still another aspect of the invention, the above described polyether-functional liquid electrolyte is preferably mixed with polyepoxide to form a curable polyether-functional electrolyte composition adapted for use in an electrochromic device. In particular, the curable composition comprises: (a) the liquid hydrolytic polycondensation product described above, and (b) liquid polyepoxide, the liquid polyepoxide being present in the composition in an amount sufficient to allow the composition to cure to a solid electrolyte. Preferably, the curable electrolyte composition additionally comprises an alkali metal salt dopant. The invention is also directed to the cured composition.

According to yet another aspect of the invention, this invention is directed to a method for making the curable polyether-functional electrolyte composition disclosed above, which method comprises: forming a reaction mixture of (A) aminosilane containing (i) at least one active amine group, and (ii) at least two hydrolyzable polyether groups attached to a silicon atom and (B) water in an amount sufficient to initiate hydrolytic polycondensation of the silane, allowing hydrolytic polycondensation of the silane in the reaction mixture for a time and at a temperature sufficient to form a liquid hydrolytic polycondensation product which has some hydrolyzable polyether groups attached to some of the silicon atoms, and mixing into the liquid hydrolytic polycondensation product a liquid polyepoxide to form the curable electrolyte composition, the liquid polyepoxide being present in the composition in an amount sufficient to allow the composition to cure to a solid electrolyte.

The invention is also directed, in another embodiment, to an electrochromic device comprising two substrates and therebetween: one electrode layer; an ion conductive layer; an electrochromic layer; an optional counter electrode; and another electrode layer, at least one of the electrode layers being transparent and each electrode layer being in contact with a respective one of the substrates, the ion conductive layer being adapted to communicate ions to and from the electrochromic layer upon application of a voltage across the electrode layers, wherein the ion conductive layer comprises the polyether-functional liquid electrolyte on the curable polyether-functional electrolyte composition disclosed above.

Another advantage of the curable electrolyte composition of the present invention is that the epoxide and amine groups employed in its formation provide adhesion properties to the cured electrolyte composition which aid in maintaining the adjacent layers of the device in intimate and fixed contact therewith.

The cured electrolyte composition of the present invention advantageously is a transparent electrolyte which would find use in those electrochromic devices which, during operation thereof, need to be transparent. The cured electrolyte composition of the present invention exhibits excellent ionic conductivity.

DETAILED DESCRIPTION OF PREFERRED EMBODIMENTS

Figure 1:
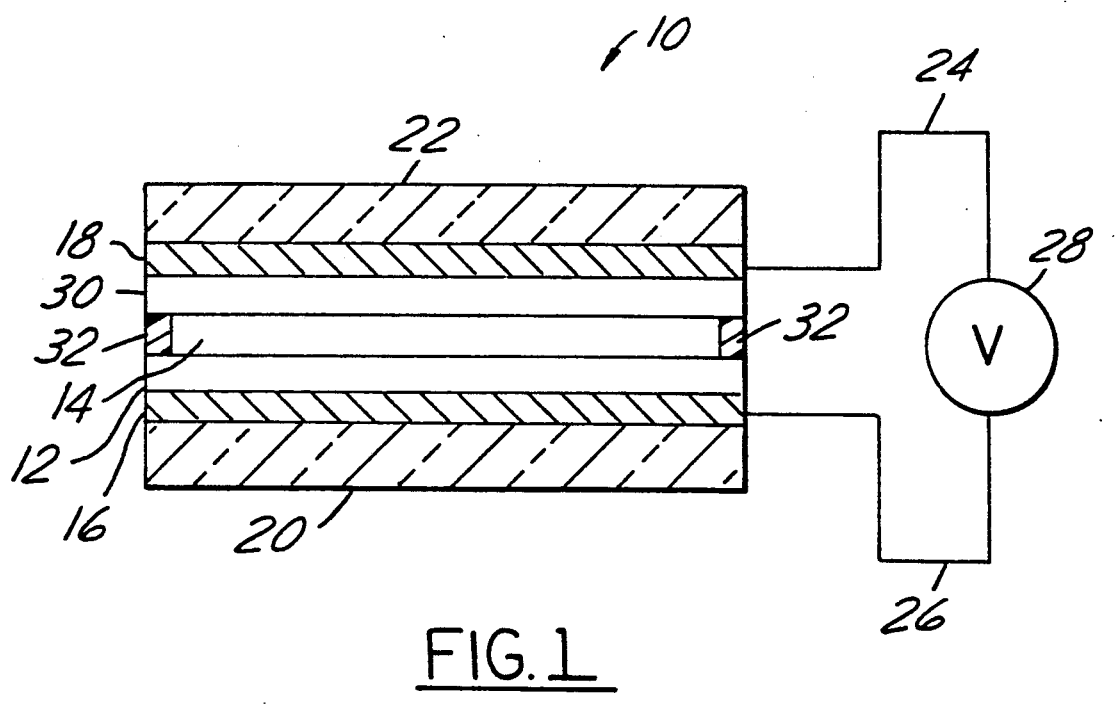
FIG. 1 is a cross-sectional view of a electrochromic device which may employ the polyether-functional liquid electrolyte on the cured polyether-functional electrolyte composition of the present invention.

This invention is directed to a polyether-functional liquid electrolyte which is a hydrolytic condensation product of aminosilane containing (i) at least one active amine group, and (ii) at least two hydrolyzable polyether groups attached to a silicon atom. The hydrolytic condensation product has some hydrolyzable polyether groups attached to some of the silicon atoms. The invention is also directed to epoxy curable compositions comprising the polyether-functional liquid electrolyte disclosed above and methods for making both. These, as well as other aspects of the invention, are described in detail below.

The aminosilane contains (i) at least one active amine group, and (ii) at least two hydrolyzable polyether groups attached to a silicon atom. The aminosilane may, and preferably does contain, a third hydrolyzable group attached to the silicon atom, which preferably is a hydrolyzable polyether group. By active amine group is meant a primary or secondary amine. Preferably, the aminosilane contains a primary amine group. The aminosilane may additionally contain tertiary amine groups. Exemplary of such an aminosilane are those having the general chemical formula: $Z-Si-(OX)_3$, wherein Z is an amino-organic group containing a primary or secondary amine and an organic group. Preferably the amine is a primary amine since such amines are more reactive. Z may be, for example, $NH_2-(CH_2)_2-$, $NHCH_3-CH_2-$, or $NH_2-O(CH_2)_2-$. This X is individually selected from hydrolyzable polyether groups and from hydrolyzable organic groups, with at least two of the X's being hydrolyzable polyether groups. Preferably, all three of the X's are the same or different hydrolyzable polyether groups. Exemplary of such hydrolyzable polyether groups are those containing the moieties $-(OCH_2CH_2)-$ and $-(OCH_2CH_3CH)-$. Each polyether groups contains at least two ether moieties, and preferably contains more than two ether moieties in each polyether group. The hydrolyzable polyether group should be such that its alcohol analogue formed during hydrolysis of the aminosilane has sufficient volatility to evaporate or be vacuumed off during formation of the hydrolytic condensation product. Generally, the higher the molecular weight of X, the lower the volatility of its alcohol analogue. The polyether groups are believed to be responsible for the ability of the electrolyte of this invention to conduct ions of alkali metal salts.

While a general chemical formula has been provided above to illustrate one class of useful aminosilanes, this invention is not meant to be limited to aminosilanes having that formula. As will be apparent to those skilled in the art in view of the present disclosure, numerous aminosilanes having at least two hydrolyzable polyether groups attached to the silicon atom are known and are generally commercially available. Mixtures of aminosilanes could also be employed in this invention as the aminosilane reactant used to form the polyether-functional liquid electrolyte. The aminosilane may include non-interfering functionality such as alkyl or aryl in the molecule. The aminosilane useful in the present invention may be of any molecular weight, as long as it is a liquid at about room temperature Exemplary of aminosilanes which may be used in the present invention are 3-aminopropyltris(methoxyethoxyethoxy)silane, 3-aminopropylethyldi(methoxyethoxyethoxy)silane, and 4-aminobutyltris(methoxyethoxyethoxy)silane.

In order to form the polyether-functional liquid electrolyte of the present invention, the aminosilane is exposed to sufficient water to initiate hydrolytic condensation of the aminosilane. Hydrolytic condensation of silanes, a reaction sequence well known to those skilled in the art, involves the reaction between a water molecule and a hydrolyzable group attached to a silicon of a silane. As a result of such reaction, an X of the aminosilane of the general chemical formula above is reacted with a water molecule to generate free X—OH and replace the X of the aminosilane with H. Thus, the —OX previously attached to the silicon atom is replaced with a pendant —OH. Two such hydrolyzed aminosilanes are subsequently capable of condensing to form a —Si—O—Si— (siloxane) linkage which condensation reaction liberates a water molecule. As will be apparent to those skilled in the art in view of the present disclosure, numerous such hydrolysis and condensation reactions can take place involving more than one hydrolyzable group on each silicon atom. According to the present invention, however, it is required that the hydrolytic condensation product of the aminosilane have some such hydrolyzable groups attached to some of the silicon atoms. The product preferably has, on average, at least one and more preferably two such hydrolyzable polyether groups attached to each silicon atom. This result was determined by NMR data on the product looking at polyether groups and by looking at the resultant ionic conductivity based on how many polyether groups were present. If none were present, there was no conductivity.

As disclosed above, it is believed that the polyether groups are responsible for the ionic conductivity of the alkali metal ions, and thus it is desired to have this minimum level of polyether groups in the hydrolytic condensation product to provide sufficient polyether groups for suitable ionic conductivity.

According to the present invention, more desirable ionic conductivity is provided by having, on average, two hydrolyzable polyether groups attached to a silicon atom. If two aminosilane molecules hydrolyze and condense as described above, the molecule will contain at least two amine groups and preferably at least two polyether groups.

Generally, the normal atmosphere surrounding the aminosilane contains sufficient water necessary to initiate the hydrolysis of the aminosilane. Once the reaction starts, the water which is liberated from the subsequent condensation reaction encourages additional hydrolysis of the aminosilane. This hydrolysis reaction is further encouraged by removal of the alcohol analogue formed. Since relying on atmospheric moisture gives a rather slow reaction rate, water can be added directly, in a small amount, to the aminosilane to increase the reaction rate. In addition to adding a small amount of water directly to the aminosilane, a small amount of an acid, e.g., nitric acid, can also be added so as to preferably maintain a pH of between about 2 and 3 in the reaction mixture The acidic pH helps to accelerate the formation of the hydrolytic condensation product. By using only small quantities of water and acid, the reaction can be successfully controlled to produce the desired liquid product Adding too large an amount of water or acid will cause excessive hydrolytic condensation so that a gel is rapidly formed. It is important in this invention that the hydrolytic condensation product remain a liquid, although it may be a viscous liquid.

Optionally, but preferably, an alkali metal salt is incorporated with the aminosilane prior to or during the hydrolytic condensation reaction of the aminosilane. Exemplary of alkali metal salts which may be so employed in forming the electrolyte are chlorides, nitrates, sulfates and perchlorates of alkali metals, i.e., such salts as lithium chloride, sodium nitrate, sodium sulfate, and lithium perchlorate. The amount of alkali metal salt which may be incorporated into the electrolyte may vary and will be dependent on such factors as the particular application of the electrolyte desired and the type of salt incorporated. Generally, it has been found that the salt, when incorporated, is preferably incorporated in an amount which allows for between about 8 and about 40 ether groups per alkali metal ion in the electrolyte. The optimal amount of salt which may be incorporated will be apparent to one skilled in the art in view of the present disclosure.

Certain salts, e.g., lithium salts are more easily incorporated into the reaction mixture when dissolved first in a solvent. Exemplary of solvents which may be so employed are alcohols, ethers, ketones, aromatic hydrocarbons, phthalates, as well as compatible mixtures thereof, with alcohols being preferred Exemplary of useful alcohols are butanol, isopropanol, hexanol, methanol, ethanol and the like, with methanol being preferred. Ethers which may be used include, but are not limited to, propylene glycol methyl ether, dipropylene glycol methyl ether and ethylene glycol ether acetate, with the cellosolve type ethers being preferred. Ketones which may be so employed include methyl butyl ketone, methylisobutyl ketone, methyl propyl ketone, methyl ethyl ketone, etc. Blends of such solvents may thus be employed as the solvent in this invention. Alkali metal salts and organic solvents, especially alcohols, tend to absorb water from the atmosphere. Thus, when either or both of them are incorporated into the reaction mixture the moisture they contain is available to initiate the hydrolytic condensation of the aminosilane. While solvents which may be used have been disclosed above, this disclosure is not meant to be limiting. Other suitable organic solvents which may be used will be apparent to those skilled in the art in view of the present disclosure.

The reaction mixture of the aminosilane and water (which may be that absorbed from the atmosphere) can simply be allowed to stand for a sufficient number of hours at a desired temperature to allow the hydrolytic condensation product to form. This mixture can be stirred or mixed in some way, if desired. Elevating the temperature of the reaction mixture is useful to help drive off the analogue alcohol formed, which increases the rate of formation of the hydrolytic condensation product. Generally, the mixture is subjected to solvent removal by, e.g., vacuum evaporation, heating under a dry atmosphere, or under flowing hot dry air. The completeness of the hydrolytic condensation reaction can be determined by analytical techniques such as Nuclear Magnetic Resonance (NMR) and Fourier Transformation Infrared Spectroscopy (FTIR). In order to discontinue further hydrolytic condensation reactions, once the desired liquid product has been formed, it is desirable to remove all moisture from the reaction mixture. The liquid hydrolytic condensation product is generally stored under anhydrous Conditions in order to prevent further hydrolytic condensation reactions. It is necessary that the hydrolytic condensation product be a liquid, although it may be a viscous liquid as long as it can be mixed with a liquid polyepoxide to form the electrolyte composition of the present invention.

Optional materials which may be included in the reaction mixture include alpha-alumina, cab-o-sil or other well known materials which act as inert fillers to give more mechanical stability and to increase the viscosity. Such materials might be useful if it is desired to use the hydrolytic condensation product itself as an electrolyte material in, e.g., an electrochromic device. If it is intended that the hydrolytic decomposition product is to be used in admixture with the liquid polyepoxide, such optional materials would generally not be added until the curable composition was formed.

While numerous aminosilanes and alkali metal salts which may be employed to make the polyether-functional liquid electrolyte of the present invention have been disclosed herein, still other such materials useful in this invention will be apparent to those skilled in the art in view of the present disclosure.

To form the epoxy curable electrolyte composition of the present invention, the liquid hydrolytic condensation product of aminosilane disclosed herein is combined with liquid polyepoxide. The liquid polyepoxide is present in the composition in an amount sufficient to allow the composition to cure and form a solid electrolyte composition. Preferably, only near the minimum amount necessary to solidify the composition is employed to maintain the composition as predominantly the hydrolytic polycondensation product to provide optimal ionic conductivity. The polyepoxide as described herein means epoxide compounds or polymers containing two or more epoxide groups wherein the polyepoxide may be substituted with non-interfering functionality (that is, functionality which does not interfere with the intended reaction of epoxide and active amine hydrogens) such as hydroxyl. Preferably, the polyepoxide contains, on the average, about two epoxide groups per molecule. Polyepoxide resins useful in the invention are preferably selected from aliphatic, cycloaliphatic and aromatic polyepoxides, preferably having a number average molecular weight between about 140 and about 1000. Such polyepoxides are well known in the art and any of these may be employed in the present invention. Several particularly suitable types of polyepoxides include: (1) polyglycidyl ethers of polyhydric alcohols and polyhydric phenols; (2) epoxidized esters of polyethylenically unsaturated monocarboxylic acids; (3) glycidyl esters of poly-basic acids; (4) epoxidized esters of unsaturated monohydric alcohols and polycarboxylic acids; and (5) epoxidized polymers and copolymers of diolefins.

Such polyepoxide materials are commercially available, for example, as Epon 828 and 830; trademark, Shell Chemical Co. and Araldite RD-2 (1,4-butanediol diglycidyl ether); trademark, Ciba-Geigy Corporation.

Many polyepoxides other than those recited in this or other referenced patents will be apparent to those skilled in the art in view of this disclosure. Compatible mixtures of any of these polyepoxides are also suitable.

Advantageously, the curable electrolyte of the present invention is a viscous liquid that can be easily applied to one of the layers of the electrochromic device before they are assembled. Additionally, the electrolyte is capable of subsequently solidifying so as to avoid problems associated with containment of liquid or gel electrolytes. Looking to electrochromic device 10 of FIG. 1, after electrode layer 18 is applied to substrate 22, a layer of the electrolyte of this invention can be applied to layer 18 or to optional counter electrode layer 30. Subsequently a substrate layer 20 carrying an electrode layer 16 having thereon an electrochromic material layer 12 would be assembled as in FIG. 1 to sandwich the electrolyte layer 14 in the device. The electrodes are provided with external electrical leads 24 and 26 connected to a voltage providing source 28. Since the composition is a viscous liquid when provided in the device, it is easily assembled and adjacent device layers are in intimate contact with the composition. Advantageously, the curable electrolyte composition is capable of crosslinking at room temperature in a few hours or, at an elevated temperature, in a few minutes. The solidified composition maintains the device as a rigid unit.

The electrodes used in the electrochromic device of this invention may be any material which is electronically conductive. At least one of the electrode-substrate combinations is transparent, although both may be. If it is intended that the electrode be a light transmitting electrode, there may be used a light transmitting film of an electrically conductive metal oxide such as doped or undoped tin oxide, indium oxide, zinc oxide and the like. The thickness of the transparent electrode layer generally falls within the range of 200 nm to several microns, correspondingly varying in transparency and resistance.

The transparent electrode layer may be formed on the substrates, either of items 20 and 22 of FIG. 1 by any known technique, including vacuum evaporation, chemical vapor deposition, sol-gel deposition, ion plating, reactive sputtering, etc. The substrates, at one of which is transparent, can be plastic, quartz, glass, etc. The transparent electrode layer may be formed by the so-Called thick film processes such as screen printing or coating. When one of the thick batch film processes is used, (1) a paste containing metal compound micro particles or (2) a solution of an organic metal compound such as metal alcoholate or its oligomer is coated and sintered to form the transparent electrode layer. Preferably, the transparent electrode material is tin oxide doped with fluorine. The non-transparent electrode material selected from light-reflecting electrode materials (e.g., Al, Ag, Pt or Ni) or other electrode materials (e.g., Au, Pd, Cr, Ir, Ru, Rh or C).

The electrochromic layer may be selected from any electrochromic material, many of which are well known to those skilled in the art and commercially available. Cathodic electrochromic materials include non-stoichiometric (i.e., oxygen deficient) metal oxides wherein the metal has variable oxidation states. Exemplary of such cathodic electrochromic materials useful in this invention are those selected from the group comprising tungsten oxide, molybdenum oxide, vanadium oxide, titanium oxide, lead oxide, and bismuth oxide and compatible mixtures of any of them. Anodic electrochromic materials which may be used in this invention include fully oxidized compounds comprising metal wherein the metal has variable oxidation states. Exemplary of such anodic electrochromic materials are Prussian blue, iridium oxide and nickel hydroxide and compatible mixtures of any of them. Preferred electrochromic materials for use in electrochromic devices of this invention include non-stoichiometric, oxygen deficient tungsten oxide as the cathodic electrochromic material and fully oxidized iridium oxide as an anodic electrochromic material.

Usually the thickness of the electrochromic layer is between about 0.1 and 100 microns. However, since a small potential will provide an enormous field strength across very thin films, films of 0.1-10 microns thickness are preferred over thicker ones. Optimal thickness also will be determined by the material of the film. The electrochromic layer may be provided on the electrode layer by any suitable technique, for example, by vacuum deposition, chemical vapor deposition, electrolytic, thermal evaporation, and the like. Selection of the optimal electrochromic material and method of its deposition will be apparent to those skilled in the art in view of the present disclosure.

In the embodiment of the device shown in FIG. 1, the device could be formed by applying a layer of electrolyte material 14 made according to an embodiment of the present invention, between electrochromic layer 12 and electrode 18. That is, a layer of the polyether-functional liquid electrolyte or the curable electrolyte composition could be deposited directly on, e.g., either electrode layer 18 or the optional counter electrode 30 or electrochromic material layer 12 and thereafter the device could be assembled as shown. The thickness of the electrolyte layer may vary widely. Selection of the optimal thickness will be apparent to one skilled in the art in view of the present disclosure. The desired thickness of electrolyte layer is obtained by assembling the device with spacers 32 at the four corners of the device. The spacers can be made from any inert material such as certain types of plastics and one example used in this application is small pieces of glass. The spacers should be as small as possible to obtain the desired result. The spacers used herein each had an area of 1 square millimeter.

If an embodiment of polyether-functional liquid electrolyte according to the present invention is used, the edges of the device would need to be sealed to contain the liquid. If a curable electrolyte composition according to the present invention is used, as is preferably the case, the composition will crosslink in 2-3 hours to form a solid by reaction between the epoxide groups of the polyepoxide and the active amine hydrogens of the polyether-functional liquid electrolyte; therefore, no sealing of the device is necessary.

As would be apparent to those skilled in the art in view of the present disclosure, the electrochromic device of this invention may comprise other components, e.g., counter electrodes, a second electrochromic layer, etc.. Counter electrodes are generally employed between the ion conductive layer and an electrode of the device (i.e., as shown in layer 30 between ion conductive layer 14 and electrode layer 18 of the device of FIG. 1) to improve operation of the device. A counter electrode may be formed of, e.g., a fully oxidized $WO_3$ or $V_2O_5$. This counter electrode material is generally not meant to be electrochromic.

While embodiments of the electrolyte of the present invention have been found to be particularly useful in electrochromic devices, their use is not to be limited to electrochromic devices. The electrolyte of the invention may be used in any application wherein this type of electrolyte would be useful, e.g., in a battery or chemical sensor.

The invention will be further understood by referring to the following detailed examples which exemplify embodiments of polyether-functional liquid electrolytes as well as epoxy curable compositions comprising same made according to the present invention. It should be understood that the specific examples are presented by way of illustration and not by way of limitation. The electrochromic cell of the example is assembled as in FIG. 1.

EXAMPLE 1

Into a 250 cc glass jar, 44.4 g (0.1 moles) of 3-aminopropyltris(methoxyethoxyethoxy)silane was added. Separately, 10.6 g (0.1 mole) lithium perchlorate was dissolved in 10.6 g (0.33 mole) of anhydrous methanol. The lithium perchlorate/methanol was then added to the jar. To adjust the pH of the mixture in the jar to 2-3, 0.01 cc of 10% nitric acid was added. To initiate hydrolysis of the silane, 1.0 cc of water was added to the mixture in the jar. The mixture was then stirred for 48 hours and vacuum dried at room temperature for 72 hours. The temperature was then increased to 70° C. under vacuum and held for 5 hours.

The resultant dried liquid electrolyte was then mixed with liquid epoxy (butanediol diglycidyl ether) at a ratio of 10 parts by weight liquid electrolyte to 1 part epoxy to form a curable composition. The composition was placed directly into an electrochromic cell (sandwich style) between an electrochromic layer and a counter electrode layer. The electrolyte layer was squeezed to about 0.1 mm thick. The electrochromic cell consisted of two glass substrates each coated on one side with fluorine doped tin oxide (transparent electrode). One electrode layer had been overcoated with tungsten oxide which acts as the electrochromic layer while the second electrode layer had been overcoated with vanadium oxide which acts as the counter electrode. The curable electrolyte composition in the cell cured in approximately 3 hours at room temperature. The resultant cured composition was solid, transparent, and adhesive. It had excellent ionic conductivity of $4 \times 10^4$ $(ohm^{-1})(cm^{-1})$ at room temperature.

EXAMPLE 2

Into a 250 cc glass jar, 60 g of 4-aminobutyltris-(methoxyethoxyethoxy)silane is added. Separately, 10 g of lithium chloride is dissolved in 30 g of anhydrous acetonitrile. The lithium chloride/acetonitrile is then added to the jar. To adjust the pH of the mixture in the jar to 2-3 with 0.01 cc of 10% hydrochloric acid is added. To initiate hydrolysis of the silane, 1.0 cc of water is added to the mixture in the jar The mixture is then stirred for 48 hours and vacuum dried at room temperature for 72 hours. The temperature is then increased to 70° C. under vacuum and held for 5 hours.

The resultant dried liquid electrolyte is then mixed with liquid epoxy (diglycidyl ether of para-amino phenol) at a ratio of 10 parts by weight of the liquid electrolyte to 1 part epoxy. As in Example 1, the composition is placed directly into an electrochromic cell (sandwich style) between an electrochromic layer and a counter electrode layer, then the cell is squeezed to form an electrolyte layer about 0.15 mm thick. The electrochromic cell consists of two plastic substrates each coated on one side with a layer of fluorine doped tin oxide (transparent electrode.) One electrode layer is overcoated with vanadium oxide which acts as the electrochromic layer while the second electrolyte layer is overcoated with polypyrrole which acts as the counter electrode. The electrolyte composition in the cell cures in approximately 3 hours at room temperature. The resultant cured electrolyte composition is solid, transparent and adhesive, and has excellent ionic conductivity of $2.9 \times 10^{-4}$ (ohm$^{-1}$) (cm$^{-1}$) at room temperature.

EXAMPLE 3

Into a 500 cc glass flask, 300 g of 3-amino propylethyldi(methoxyethoxyethoxy)silane is added. Separately, 50 g lithium perchlorate is dissolved in 200 g of acetonitrile. This lithium perchlorate/acetonitrile mixture is then added to the flask. The pH of the mixture in the flask is adjusted to 2-3 with 0.1 cc of 10% nitric acid. To initiate hydrolysis, 5 cc of water is added to the mixture. The mixture is then stirred for 48 hours and vacuum dried at room temperature for 72 hours. The temperature is then increased to 70° C. under vacuum and held for 5 hours. The resultant dried liquid electrolyte is then mixed with epoxy (sorbitol polyglycidylether) at a ratio of 15 parts by weight liquid electrolyte to 1 part epoxy to form a curable composition.

The composition is placed directly into an electrochromic cell (sandwich style) and the cell is squeezed to form an electrolyte layer 0.15 mm thick. The electrochromic cell consists of two glass substrates each coated on one side with indium—tin oxide (transparent electrodes). One electrode layer is overcoated with tungsten oxide which acts as the electrochromic layer while the second electrode layer is overcoated with vanadium oxide which acts as the counter electrode. The electrolyte composition in the cell cures in approximately 2 minutes at 100° C. The resultant cured composition is solid, transparent, adhesive and has excellent ionic conductivity of $4.4 \times 10^{-4}$ (ohm$^{-1}$) (cm$^{-1}$) at room temperature.

EXAMPLE 4

Into a 250 cc glass jar, 50 g of 3-aminopropyltris (methoxyethoxyethoxy)silane is added. Separately, 10 g of lithium nitrate is dissolved in 20 g of anhydrous ethanol. The lithium nitrate/ethanol mixture is then added to the jar containing the silane. To adjust pH of the mixture in the jar to 2-3, 0.01 cc of 10% hydrochloric acid is added thereto. Hydrolysis of the silane is initiated by adding 1 cc of water to the mixture. The mixture is then stirred for 48 hours and vacuum dried at room temperature for 72 hours. The temperature is then increased to 70° C. under vacuum and held for 5 hours. The dried liquid electrolyte product is then mixed with epoxy (diglycidyl ether of para-amino phenol) at a ratio of 10 parts by weight solution to 1 part epoxy to form a curable composition. The curable composition is placed directly into an electrochromic cell (sandwich style) and the cell squeezed to form an electrolyte layer 0.15 mm thick. The electrochromic cell consists of two plastic substrates each coated on one side with F-doped tin oxide (transparent electrodes). One substrate is overcoated with tungsten oxide which acts as the electrochromic layer while the second substrate is overcoated with vanadium oxide which acts as the counter electrode. The electrolyte mixture cures in approximately 3 hours at room temperature. The resultant solid electrolyte composition is transparent, adhesive and has excellent ionic conductivity of $3.5 \times 10^{-4}$ (ohm$^{-1}$) (cm$^{-1}$) at room temperature.

EXAMPLE 5

Into a 500 cc glass flask, 300 g of 4-aminobutyltris(methoxyethoxyethoxy)silane is added. Separately, 50 g of sodium chloride is dissolved in 100 g of anhydrous methanol. This sodium chloride/methanol mixture is then added to the flask. To adjust pH of the mixture in the flask to 2-3, 0.1 cc of 10% nitric acid is added. To initiate hydrolysis of the silane, 5 cc of water is added to the mixture. The mixture is then stirred for 48 hours and vacuum dried at room temperature for 72 hours. The temperature of the mixture is then increased to 70° C. under vacuum and held for 5 hours. The dried liquid electrolyte is then mixed with epoxy (diglycidyl ether of para-amino phenol) at a ratio of 10 parts by weight solution to 1 part epoxy to form a curable composition.

The composition is placed directly into an electrochromic cell (sandwich style) and the cell squeezed to form a 0.2 mm thick electrolyte. The electrochromic cell consists of two glass substrates each coated on one side with a indium-tin oxide layer (transparent electrode). One electrode layer is overcoated with tungsten oxide which acts as the electrochromic layer while the second electrode layer is overcoated with polypyrrole which acts as the counter electrode. The electrolyte composition cures in approximately 2 minutes at 100° C. The resultant solid electrolyte composition is transparent, adhesive and has excellent ionic conductivity of $5.9 \times 10^{-6}$ (ohm$^{-1}$) (cm$^{-1}$) at room temperature.

EXAMPLE 6

Into a 250 cc glass jar, 30 g of 3-aminopropylethyldi(methoxyethoxyethoxy)silane is added. Separately, 5 g potassium nitrate is dissolved in 20 g of anhydrous methanol. This potassium nitrate/methanol mixture is then added to the jar. To adjust the pH of the mixture in the jar to 2-3, 0.01 cc of 10% nitric acid is added. To initiate hydrolysis of the silane, 0.5 cc of water is added to the mixture. The mixture is then stirred for 48 hours and vacuum dried at room temperature for 72 hours. The temperature is then increased to 70° C. under vacuum and held for 5 hours. The dried liquid electrolyte is then mixed with liquid epoxy (butanedioldiglycidyl ether) at a ratio of 10 parts by weight liquid electrolyte to 1 part epoxy to form a curable electrolyte composition. The mixture is placed directly into an electrochromic cell (sandwich style) and the cell squeezed to form a electrolyte layer 0.15 mm thick. The electrochromic cell consists of two glass substrates each coated on one side with F-doped tin oxide which act as a transparent electrode. One electrode layer is overcoated with tungsten oxide which acts as the electrochromic layer while the second electrode layer is overcoated with polypyrrole which acts as the counter electrode. The electrolyte composition cures in approximately 3 hours at room temperature. The resultant solid electrolyte is transparent, adhesive, and has excellent ionic conductivity of $6.7 \times 10^{-6}$ (ohm$^{-1}$) (cm$^{-1}$) at room temperature.

EXAMPLE 7

Into a 250 cc glass jar, 30 g of 3-amino propyltris(methoxyethoxyethoxy)silane is added. To adjust its pH to 2-3, 0.01 cc of 10% nitric acid is added. To initiate hydrolysis of the silane, 0.5 cc of water is added to the mixture. The mixture is then stirred for 48 hours and vacuum dried at room temperature for 72 hours. The temperature is then increased to 70° C. under vacuum and held for 5 hours. The dried liquid electrolyte is then mixed with epoxy (butanediol diglycidyl ether) at a ratio of 10 parts by weight solution to 2 parts epoxy to form a curable liquid composition.

The composition is placed directly into an electrochromic cell (sandwich style) and the cell squeezed to form a layer of electrolyte 0.1 mm thick. The electrochromic cell consists of two glass substrates each coated on one side with indium-tin oxide which acts as a transparent electrode. One substrate is overcoated with tungsten oxide which acts as the electrochromic layer while the second substrate is overcoated with vanadium oxide which acts as the counter electrode. The tungsten oxide and vanadium oxide layers are electrolytically doped with lithium ions before cell assembly. The electrolyte mixture cures in approximately 3 hours at room temperature. The resultant cured solid electrolyte material is transparent, adhesive and has excellent ionic conductivity of $6.6 \times 10^{-6}$ (ohm$^{-1}$) (cm$^{-1}$) at room temperature.

In view of the disclosure, many modifications of this invention will be apparent to those skilled in the art. It is intended that all such modifications which fall within the true scope of this invention be included within the terms of the appended claims.

I claim:

1. A curable polyether-functional electrolyte composition adapted for use in an electrochromic device, said composition comprising:
   (a) a liquid hydrolytic polycondensation product of aminosilane in which said aminosilane contains (i) at least one active amine group, and (ii) at least two hydrolyzable polyether groups attached to a silicon atom, said hydrolytic polycondensation product having some of said hydrolyzable polyether groups attached to some of said silicon atoms, and
   (b) liquid polyepoxide,
   said liquid polyepoxide being present in said composition in an amount sufficient to allow said composition to cure to a solid electrolyte.

2. The curable polyether-functional electrolyte composition according to claim 1, wherein said aminosilane comprises three hydrolyzable polyether groups attached to a silicon atom.

3. The curable polyether-functional electrolyte composition according to claim 1, wherein each of said hydrolyzable polyether groups contains at least two ether moieties independently selected from —(OCH$_2$CH$_2$)— and —(OCH$_2$CH$_3$CH)—.

4. The curable polyether-functional electrolyte composition according to claim 1, wherein said product has, on average, at least one such hydrolyzable polyether group attached to each silicon atom.

5. The curable polyether-functional electrolyte composition according to claim 4, wherein said product has, on average, about two such hydrolyzable polyether groups attached to each silicon atom.

6. The curable polyether-functional electrolyte composition according to claim 1, wherein said electrolyte further comprises alkali metal salt.

7. The curable polyether-functional electrolyte composition according to claim 6, wherein said salt is selected from salts of sodium and lithium.

8. A method for making a curable polyether-functional electrolyte composition, which method comprises:
   forming a reaction mixture of (i) aminosilane containing at least one active amine group, and at least two hydrolyzable polyether groups attached to a silicon atom and (ii) water in an amount sufficient to initiate hydrolytic polycondensation of said silane,
   allowing hydrolytic polycondensation of said silane in said reaction mixture for a time and at a temperature sufficient to form a liquid hydrolytic polycondensation product which has some of the hydrolyzable polyether groups attached to some of the silicon atoms, and
   mixing into said liquid hydrolytic polycondensation product a liquid polyepoxide to form said curable electrolyte composition,
   said liquid polyepoxide being present in said composition in an amount sufficient to allow said composition to cure to a solid electrolyte.

* * * * *